(12) United States Patent
Faber et al.

(10) Patent No.: US 10,414,226 B2
(45) Date of Patent: Sep. 17, 2019

(54) SWITCHABLE BEARING BUSH FOR A MOTOR VEHICLE

(71) Applicant: Schaeffler Technologies AG & Co. KG, Herzogenaurach (DE)

(72) Inventors: Daniel Faber, Nürnberg (DE); Hartmut Krehmer, Erlangen (DE); Markus Bäuml, Erlangen (DE); Jürgen Bauer, Heroldsbach (DE); Benjamin Wübbolt-Gorbatenko, Erlangen (DE); Markus Kraus, Roßtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 43 days.

(21) Appl. No.: 15/557,254

(22) PCT Filed: Jan. 26, 2016

(86) PCT No.: PCT/DE2016/200036
§ 371 (c)(1),
(2) Date: Sep. 11, 2017

(87) PCT Pub. No.: WO2016/150436
PCT Pub. Date: Sep. 29, 2016

(65) Prior Publication Data
US 2018/0050574 A1   Feb. 22, 2018

(30) Foreign Application Priority Data

Jul. 30, 2015   (DE) ........................ 10 2015 214 519

(51) Int. Cl.
*B60G 7/00*   (2006.01)
*F16F 1/36*   (2006.01)
*B60G 17/02*   (2006.01)

(52) U.S. Cl.
CPC ............ *B60G 7/006* (2013.01); *B60G 17/02* (2013.01); *B60G 17/025* (2013.01); *F16F 1/3615* (2013.01); *B60G 2202/42* (2013.01); *B60G 2204/143* (2013.01); *B60G 2204/41* (2013.01); *B60G 2204/4104* (2013.01); *B60G 2206/11* (2013.01); *B60G 2206/1116* (2013.01)

(58) Field of Classification Search
CPC .. F16F 1/3615; F16F 1/387; B60G 2204/143; B60G 2204/41; B60G 2204/4104;
(Continued)

(56) References Cited

U.S. PATENT DOCUMENTS 5,228,664 A * 7/1993 Moulinet .................. F16C 7/04
                                                    248/632
6,105,944 A * 8/2000 David ..................... F16F 1/387
                                                    267/140.11
(Continued)

FOREIGN PATENT DOCUMENTS

DE    69622141 T2    11/2002
DE    10351574 A1    6/2005
(Continued)

*Primary Examiner* — Laura Freedman
(74) *Attorney, Agent, or Firm* — Antun M. Peakovic

(57) ABSTRACT

Bearing bushes, for example, for a chassis of a motor vehicle are disclosed. A bearing bush may include a shaft, a hub, and an elastomer element which is arranged radially therebetween. The bearing bush may be configured to be switched between a first and second stiffness levels. The hub may have a main body and a plurality of radially adjustable plungers which are arranged in the main body. The plungers may be configured to engage the elastomer element and change the stiffness of the bearing bush from the first stiffness level to the second stiffness level. The elastomer element may have a plurality of radial elements arranged on the main body and configured to be compressed via a respective plunger in order to increase the stiffness of the
(Continued)

bearing bush. An actuator including an electric motor may be configured to radially adjust the plungers in the main body.

18 Claims, 2 Drawing Sheets

(58) Field of Classification Search
CPC .................. B60G 2206/11; B60G 2206/99; B60G 17/02; B60G 17/025; B60G 7/006; B60G 2202/42; B60G 2206/1116
See application file for complete search history.

(56) References Cited

U.S. PATENT DOCUMENTS

| | | | | |
|---|---|---|---|---|
| 8,240,645 B2* | 8/2012 | Eberhard | ............... | B60G 7/006 267/140.12 |
| 8,313,108 B2* | 11/2012 | Ac | ............... | B60G 17/021 280/5.5 |
| 8,844,914 B2* | 9/2014 | Kim | ............... | F16F 1/361 188/267.2 |
| 2008/0054539 A1* | 3/2008 | Hodges | ............... | F16F 1/38 267/140.12 |
| 2018/0149225 A1* | 5/2018 | Wubbolt-Gorbatenko | | F16F 1/3615 |
| 2018/0163807 A1* | 6/2018 | Krehmer | ............... | F16F 1/3615 |
| 2018/0209478 A1* | 7/2018 | Krehmer | ............... | F16C 27/063 |
| 2018/0223936 A1* | 8/2018 | Rumpel | ............... | F16F 1/3876 |
| 2018/0223937 A1* | 8/2018 | Rumpel | ............... | B60G 7/001 |

FOREIGN PATENT DOCUMENTS

| | | |
|---|---|---|
| EP | 0493163 A2 | 7/1992 |
| EP | 0784163 A1 | 7/1997 |
| FR | 2991244 A1 | 12/2013 |
| JP | H05202985 A | 8/1993 |
| JP | 3039105 | 5/2000 |
| WO | 9508450 A1 | 3/1995 |

* cited by examiner

SWITCHABLE BEARING BUSH FOR A MOTOR VEHICLE

CROSS-REFERENCE TO RELATED APPLICATIONS

This application is the U.S. National Phase of PCT Appln. No. PCT/DE2016/200036 filed Jan. 26, 2016, which claims priority to DE 102015214519.0 filed Jul. 30, 2015 and DE 102015003823.0 filed Mar. 23, 2015, the entire disclosures of which are incorporated by reference herein.

TECHNICAL FIELD

The disclosure relates to a bearing bush having variable stiffness levels, for example, for a chassis of a motor vehicle.

BACKGROUND

The construction and the resulting operating data of bearing bushes which are used in a chassis of a motor vehicle may influence the driving and steering properties of the motor vehicle. Relatively minor changes to a spring constant or stiffness of the bearing bushes can have considerable effects on the vehicle properties, such as the understeer or oversteer behavior and chassis noise, vibrations and harshness. Depending on the setting of the bearing bush, the motor vehicle may have a relatively "soft" or a relatively "hard" running behavior.

Different bearing bushes are known from the generally known prior art in the chassis field of a motor vehicle. Firstly, purely mechanical bearing bushes or rubber bearings are known which have a defined stiffness. Furthermore, hydraulically damped chassis bushes with fixed or variable stiffness are known. Moreover, bearings with magnetorheological liquids or magnetorheological elastomers are known, it being possible for the stiffness to be varied via a magnetic field.

For example, DE 696 22 141 T2 discloses a method for producing and using a suspension bush with variable stiffness for controlling the relative movement between a chassis link in a motor vehicle and a frame component of the motor vehicle. The suspension bush has a variable stiffness which is realized by virtue of the fact that a magnetorheological elastomer or gel is enclosed, the stiffness of which can be set variably over a broad range, to be precise by way of a controllable magnetic field. The variable controllable magnetic field is generated by means of an electromagnet structure which is integrated completely into a suspension bush structure as part of the structure.

SUMMARY

One object of the disclosure is to develop a bearing bush with adjustable stiffness for a chassis of a motor vehicle.

According to an embodiment of the disclosure, the hub has a main body and a plurality of radially adjustable plungers which are arranged in the main body in a circular manner, the plungers interacting with the elastomer element in order to change the stiffness of the bearing bush. In other words, the elastomer element is configured radially around the shaft and comes radially into contact with the plungers. In a first switching state of the bearing bush, the elastomer element bears merely against the plungers, without being compressed in the process. In the case of loading of the bearing bush, the shaft is displaced relative to the hub, the elastomer element having a maximum deformation buffer. A low stiffness of the bearing bush is realized as a result, comfortable driving being assisted. In a second switching state of the bearing bush, the elastomer element is compressed radially by the plungers. In the case of loading of the bearing bush, the shaft is displaced only to a relatively small amount relative to the hub on account of the minimum deformation buffer of the elastomer element. A high stiffness of the bearing bush is realized as a result, sporty driving being assisted.

In accordance with one embodiment, the elastomer element is of star-shaped configuration and has at least four radial elements, the at least four radial elements being arranged on the main body in a respective cutout which is of substantially complementary configuration with respect to them, and it being possible for the at least four radial elements to be compressed via the respective plunger in order to increase the stiffness of the bearing bush. Furthermore, it is also conceivable, however, that the elastomer element has fewer radial elements, in particular three or two radial elements. The at least four radial elements may have a conical section at one distal end. In the case of a compression of the elastomer element, the conical section is deformed elastically, the elastomer material filling the clearances at least partially at the cutouts of preferably cylindrical configuration in the main body. In this way, the elastomer element is compressed by way of the plungers. The deformation energy which is stored in the elastomer element is at a maximum. A relief of the elastomer element makes complete restoration of the original shape of the elastomer element possible.

For radial adjustment in the main body, the plungers may interact with an actuator, comprising an electric motor and an optional gear mechanism. Here, the actuator is controlled and regulated via a control element. In accordance with one embodiment, the actuator can be controlled manually via the control element. To this end, a driver of the motor vehicle can vary between different stiffness levels of the bearing bush via a respective switch and can assist the respective driving mode of the motor vehicle as a result. Furthermore, it is also conceivable, however, to control the actuator in a manner which is dependent on the driving situation and therefore automatically via the control element.

Furthermore, the actuator may include a band which is arranged around the plungers in a circular manner and interacts radially with the plungers, is guided around the plungers, and can be actuated for radially adjusting the plungers in the main body. The band may be arranged at a distal end section of the plungers. Furthermore, the distal end section of the plungers may have a bearing element or a deflection roller for mounting the band in a manner which is minimized in terms of friction. An actuation of the band reduces, in particular, the length or the circumference of the band. By virtue of the fact that the band is arranged around the plungers in a circular manner, the plungers are at the same time displaced radially inward. This results in a compression of the elastomer element and therefore an increase in the stiffness of the bearing bush.

In accordance with one embodiment, the band can be actuated via a screw element, a circumference of the band being reduced or increased in the case of an actuation of the screw element, depending on the rotational direction of the screw element. In particular, a structure which interacts with the screw element and permits a movement of the band is configured on the band. As a consequence, the change in the circumference of the band takes place in accordance with the hose clip mechanism. Here, a first end section of the band may be fixed on the hub, and a second end section of the band may be clamped in on the screw element.

The band may be wound on an outer circumferential face of a roller. In other words, the winding of the band on the outer circumferential face of the roller makes a reduction of the circumference of the band possible. Furthermore, a first end section of the band may be fixed on the hub, and a second end section of the band may be clamped in on the roller.

In accordance with another embodiment, the band is guided through the roller and can be wound on the outer circumferential face of the roller. Here, the roller has the function of a double roller during winding up. The band is namely wound up from both sides at the same time. Both ends of the band are fixed on the roller. Furthermore, it is also conceivable to configure the band as an endless band which has no free ends.

In accordance with another embodiment, the respective plunger can be actuated via a respective toggle lever for a radial adjustment in the main body, it being possible for the toggle levers to be actuated jointly via a fiber element which interacts with them. In other words, in the case of its actuation, the respective toggle lever presses radially onto the respective plunger and compresses the elastomer element as a result. As a consequence, the fiber element is arranged on the toggle levers in a substantially circular manner and is mounted movably thereon.

The respective toggle lever may have a first and a second distal end, the first distal end being mounted rotatably on the main body, and the second distal end being provided to receive the fiber element. Between the two distal ends, the respective toggle lever has a section for bearing against the respective plunger. As a consequence, the respective first distal end is configured as a locating bearing. In contrast, the respective section for bearing is configured as a floating bearing on the respective plunger. In particular, a respective first lever arm may be shorter, between the respective first distal end and the respective section for bearing, than a respective second lever arm, between the respective second distal end and the respective section for bearing. In order to receive the fiber element, the respective second distal end of the respective toggle lever may have a respective bore, through which the fiber element is guided.

Furthermore, the fiber element can be wound on an outer circumferential face of a roller. As a consequence, the circumference of the fiber element is reduced by way of the winding up of the fiber element. As a result, all toggle levers are actuated at the same time, and the elastomer element is therefore compressed via the plungers.

The disclosure includes the technical teaching that the shaft and the hub may be configured from a metallic material or a polymer material.

BRIEF DESCRIPTION OF THE DRAWINGS

Further measures which improve the disclosure will be described in greater detail in the following text together with the description of preferred exemplary embodiments of the disclosure, using the Figures, in which:

FIG. 3A shows a diagrammatic sectional view of the bearing bush according to the disclosure in accordance with a second embodiment, the bearing bush having a first switching state, FIG. 3B shows a diagrammatic sectional view of the bearing bush according to the disclosure in accordance with the second embodiment, the bearing bush having a second switching state, FIG. 4 shows a diagrammatic sectional view of the bearing bush according to the disclosure in accordance with a third embodiment, and FIG. 5 shows a perspective illustration of the bearing bush according to the disclosure in accordance with a fourth embodiment.

DETAILED DESCRIPTION

Figure 1:
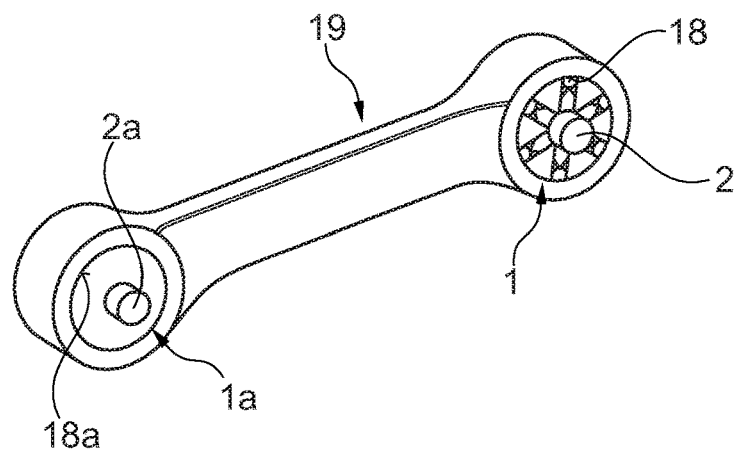
FIG. 1 shows a perspective illustration of a chassis link for a motor vehicle, the chassis link having a bearing bush according to an embodiment of the disclosure.

According to FIG. 1, a bearing bush 1 according to the disclosure is arranged in a bore 18 provided for this purpose on a chassis link 19. The chassis link 19 is installed in a chassis (not shown here) of a motor vehicle (not shown here). An axle carrier (not shown here) of the motor vehicle is fastened to a shaft 2 of the bearing bush 1. Furthermore, the chassis link 19 has a further bore 18a, in which a mechanical, non-switchable bearing bush 1a is arranged. In other words, the bearing bush 1a is configured as a conventional rubber bearing. A wheel support (not shown here) is arranged, for example, on the shaft 2a of the bearing bush 1a.

In accordance with FIGS. 2, 3a, 3b and 5, the bearing bush 1 according to the disclosure has a shaft 2, a hub 3 and an elastomer element 4 which is arranged radially between the shaft 2 and the hub 3. The hub 3 comprises a main body 5 and six radially adjustable plungers 6a-6f which are arranged at least partially in the main body 5 in a circular manner. In order to change the stiffness of the bearing bush 1, the plungers 6a-6f interact firstly with the elastomer element 4 and secondly with an actuator 9, comprising an electric motor 10.

The shaft 2 can be attached fixedly to the vehicle on a body (not shown here) of the motor vehicle, the hub 3 and the actuator 9 being part of a chassis link (not shown here). It is likewise also conceivable that the hub 3 and the actuator 9 are attached fixedly to the vehicle on the body of the motor vehicle, and the shaft is part of the chassis link.

Furthermore, the actuator 9 comprises a band 11 which interacts radially with the plungers 6a-6f, is guided around the plungers 6a-6f, and can be actuated for radially adjusting the plungers 6a-6f in the main body 5. The elastomer element 4 is of star-shaped configuration and has six radial elements 7a-7f. Here, the six radial elements 7a-7f are arranged on the main body 5 in a respective cutout 8a-8f of substantially complementary configuration with respect to them, and said six radial elements 7a-7f can be compressed via the respective plunger 6a-6f in order to increase the stiffness of the bearing bush 1. As a consequence, a compression of the elastomer element 4 increases the stiffness of the bearing bush 1.

Figure 2:
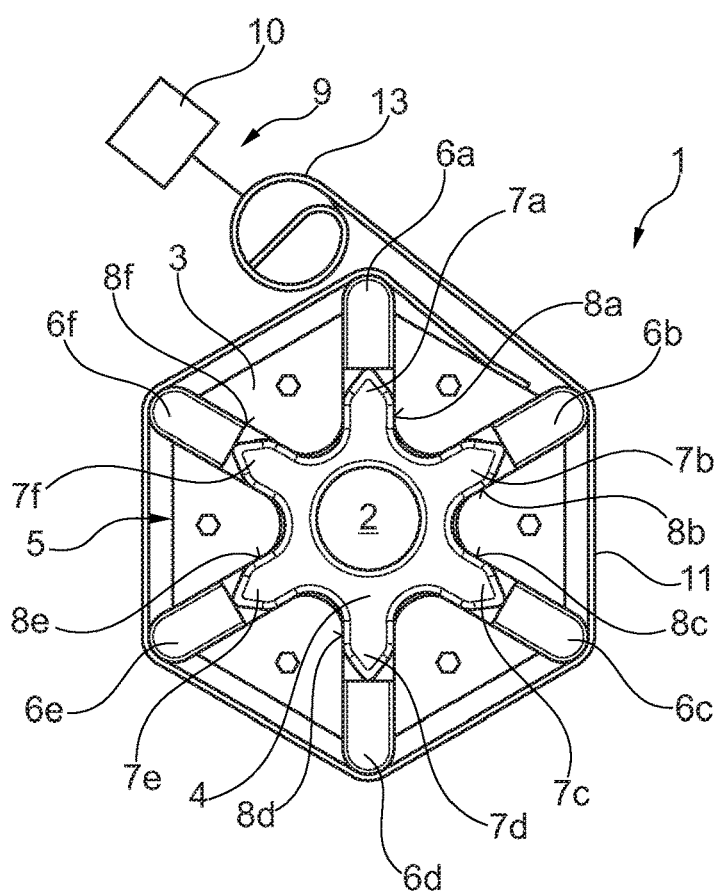
FIG. 2 shows a diagrammatic sectional view of the bearing bush according to the disclosure in accordance with a first embodiment.

According to FIG. 2, the band 11 can be wound on an outer circumferential face of a roller 13. In accordance with FIGS. 3a and 3b, the band 11 is guided through the roller 13 and can be wound on the outer circumferential face of the roller 13.

Figures 3A, 3B, 4, 5:
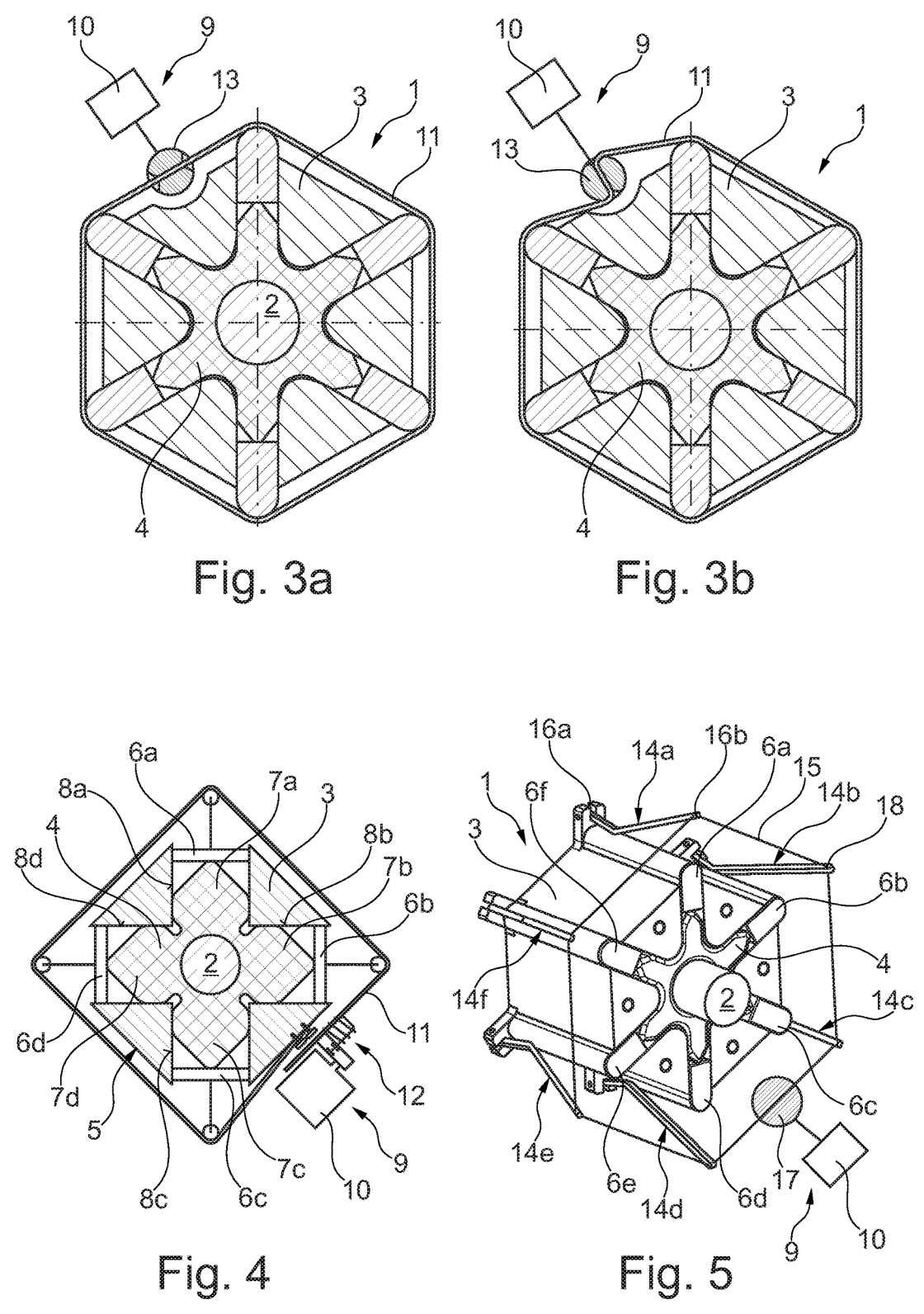

According to FIG. 4, the elastomer element 4 is of star-shaped configuration and has four radial elements 7a-7d which are arranged on the main body 5 in a respective cutout 8a-8d of substantially complementary configuration with respect to them. Furthermore, the elastomer element 4 can be compressed via four plungers 6a-6d which are arranged in a circular manner in order to increase the stiffness of the bearing bush 1. The band 11 can be actuated via a screw element 12, a circumference of the band 11 being reduced in the case of an actuation of the screw element 12. The screw element 12 is part of the actuator 9 which, furthermore, comprises the electric motor 10.

In accordance with FIG. 5, the bearing bush 1 has six toggle levers 14a-14f which interact with a fiber element 15 for the radial adjustment of the six plungers 6a-6f in the main body 5. Here, the respective toggle lever 14a-14f has a first and a second distal end 16a, 16b, the first distal end 16a being mounted rotatably on the main body 5, and the second distal end 16b being provided to receive the fiber element 15. Furthermore, the fiber element 15 can be wound on an outer circumferential face of a roller 17. Here, the roller 17 is actuated via the electric motor 10 of the actuator 9. During rolling up of the fiber element 15 which is guided through a respective bore 18 on the respective toggle lever 14a-14f, all toggle levers 14a-14f are actuated jointly and the elastomer element 4 is compressed as a result.

LIST OF DESIGNATIONS 1, 1a Bearing bush
2, 2a Shaft
3 Hub
4 Elastomer element
5 Main body
6a-6f Plunger
7a-7f Radial element
8a-8f Cutout
9 Actuator
10 Electric motor
11 Band
12 Screw element
13 Roller
14a-14f Toggle lever
15 Fiber element
16a, 16b Distal end
17 Roller
18, 18a Bore
19 Chassis link

The invention claimed is:

1. A bearing bush for a chassis of a motor vehicle, the bearing bush comprising:
a shaft, a hub and an elastomer element which is arranged radially therebetween, the bearing bush being configured to be switched between at least two stiffness levels;
wherein the hub has a main body and a plurality of radially adjustable plungers which are arranged in the main body in a circular manner, the plungers interacting with the elastomer element in order to change the stiffness of the bearing bush; and
wherein the elastomer element is of a star-shaped configuration and has at least four radial elements, the at least four radial elements being arranged on the main body in a respective cutout which is of a substantially complementary configuration with respect to the at least four radial elements, the at least four radial elements configured to be compressed via a respective plunger in order to increase the stiffness of the bearing bush.

2. The bearing bush as claimed in claim 1, wherein for radial adjustment in the main body, the plungers interact at least indirectly with an actuator, which includes an electric motor.

3. The bearing bush as claimed in claim 2, wherein the actuator comprises a band which interacts radially at least indirectly with the plungers, is guided around the plungers, and is configured to be actuated for radially adjusting the plungers in the main body.

4. The bearing bush as claimed in claim 3, wherein the band is configured to be actuated via a screw element, a circumference of the band being reduced in the case of an actuation of the screw element.

5. The bearing bush as claimed in claim 3, wherein the band is configured to be wound on an outer circumferential face of a roller.

6. The bearing bush as claimed in claim 5, wherein the band is guided through the roller and configured to be wound on the outer circumferential face of the roller.

7. The bearing bush as claimed in claim 2, wherein a respective plunger is configured to be actuated via a respective toggle lever for radial adjustment in the main body, the toggle levers configured to be actuated jointly via a fiber element which interacts with the toggle levers.

8. The bearing bush as claimed in claim 7, wherein the respective toggle lever has a first and a second distal end, the first distal end being mounted rotatably on the main body, and the second distal end being provided to receive the fiber element.

9. The bearing bush as claimed in claim 7, wherein the fiber element is configured to be wound on an outer circumferential face of a roller.

10. A bearing bush comprising:
a shaft, a hub, and an elastomer element which is arranged radially therebetween, the bearing bush being configured to be switched between a first stiffness level and a second stiffness level,
the hub having a main body and a plurality of radially adjustable plungers which are arranged in the main body, the plungers configured to engage the elastomer element and change the stiffness of the bearing bush from the first stiffness level to the second stiffness level; and
an actuator including an electric motor configured to radially adjust the plungers in the main body.

11. The bearing bush as claimed in claim 10, wherein the elastomer element has at least four radial elements, the at least four radial elements being arranged on the main body and configured to be compressed via a respective plunger in order to increase the stiffness of the bearing bush.

12. The bearing bush as claimed in claim 10, wherein the actuator includes a band which engages radially with the plungers, is guided around the plungers, and is configured to be actuated for radially adjusting the plungers in the main body.

13. The bearing bush as claimed in claim 12, wherein the band is configured to be actuated via a screw element, a circumference of the band being reduced in the case of an actuation of the screw element.

14. The bearing bush as claimed in claim 12, wherein the band is configured to be wound on an outer circumferential face of a roller.

15. The bearing bush as claimed in claim 14, wherein the band is guided through the roller and configured to be wound on the outer circumferential face of the roller.

16. The bearing bush as claimed in claim 10, wherein a respective plunger is configured to be actuated via a respective toggle lever for radial adjustment in the main body, the toggle levers configured to be actuated jointly via a fiber element which interacts with the toggle levers.

17. The bearing bush as claimed in claim 16, wherein the respective toggle lever has a first and a second distal end, the first distal end being mounted rotatably on the main body, and the second distal end being provided to receive the fiber element.

18. The bearing bush as claimed in claim 16, wherein the fiber element is configured to be wound on an outer circumferential face of a roller.

* * * * *